S. E. SAUL.
Boiler for Culinary Purposes.
No. 54,964.
Patented May 22, 1866.
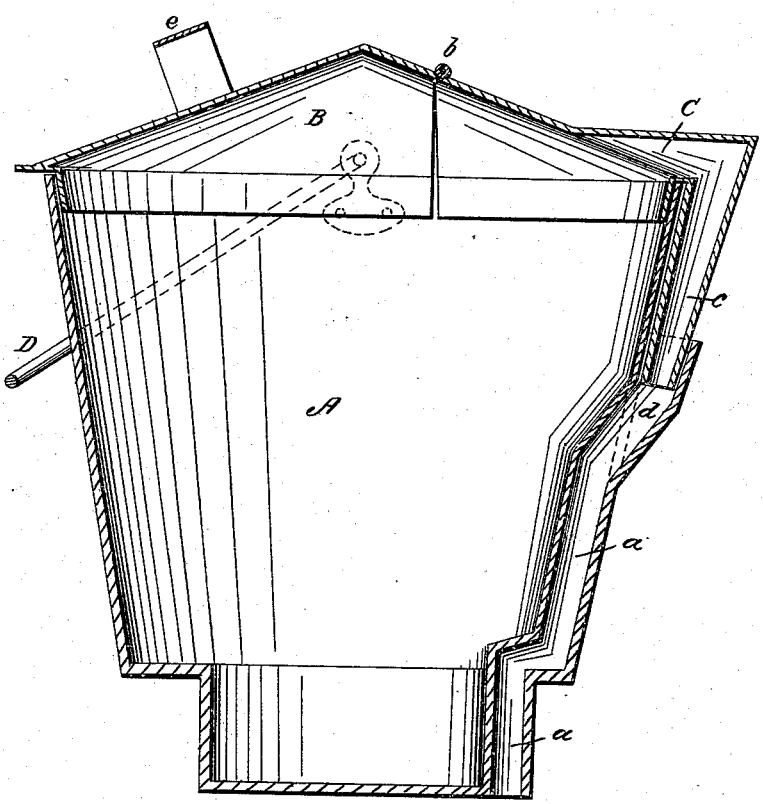
Witnesses:
Wm S. McNamara
Wm E. Lyon
Inventor:
Sarah E. Saul.

UNITED STATES PATENT OFFICE.

SARAH E. SAUL, OF NEW YORK, N. Y.

BOILER FOR CULINARY PURPOSES.

Specification forming part of Letters Patent No. 54,964, dated May 22, 1866.

*To all whom it may concern:*

Be it known that I, SARAH ELIZABETH SAUL, of the city, county, and State of New York, have invented a new and Improved Culinary Vessel; and I do hereby declare that the following is a full, clear, and exact description thereof, which will enable those skilled in the art to make and use the same.

The accompanying drawing shows a vertical section of my invention.

Similar letters of reference indicate corresponding parts.

This invention relates to that class of culinary vessels or boilers in which the steam and odor emanating therefrom is conducted by means of a tube down through the bottom of the vessel into the stove or range, and carried off with the products of combustion into the chimney.

In this class of culinary vessels as at present constructed the upper mouth of the escape-tube is not sufficiently elevated so as to be beyond the reach of the liquid contents of the vessel when agitated by boiling and when the vessel is used to near its full capacity, and to prevent a portion of the said contents from escaping into the tube and being thrown upon the fire beneath the vessel.

This objection is removed in the present invention by forming a portion of the escape conduit or tube in the cover of the vessel in such manner that the upper mouth of the tube may be located at the highest point within the vessel.

A in the drawing is an ordinary boiler with an escape-pipe, $a\ a\ d$, cast or formed on the wall of the same, the portion $d$ of the escape-pipe being outside of the line of the main wall and the portion $a\ a$ being on the inside of the wall, but the whole of the escape-pipe being substantially upon the outside of the vessel.

B is a cover, which is formed in two parts, and hinged together by a hinge, $b$, and is provided with a tube, $c\ c$, the lower end, $c$, being made to fit nicely into the upper terminus, $d$, of the tube $a\ a\ d$.

D is an ordinary bail, by which the vessel is handled or lifted. $e$ is a handle for the front part of the cover.

In operation, the whole cover of the vessel is only removed at the end of a boiling process, access for inspection or for other purposes being had by the hinged cover B, the front portion of the cover being readily thrown back.

When in use the steam flows upward into the pipe C and thence down the pipe $c\ d\ a\ a$ into the body of the stove or range.

By these means the upper mouth or terminus of the escape-tube is so elevated that the vessel may be used to its full capacity as a boiler without a portion of its contents being thrown upon the fire below, and the unpleasant dissemination of vapor and odors which attend this most useful art through the cooking apartment, and, as is frequently the case, through adjoining apartments also, is obviated in a simple and efficient manner, conducing much to general tidiness and comfort.

Having thus described my invention, I do not claim the use of an escape-pipe for conducting the emanations from a culinary boiler down into the body of the stove or range, as this has been used heretofore; but

What I do claim, and desire to secure by Letters Patent, is as follows:

The combination of the hinged cover $b$ and tube C, arranged relatively with the boiler A and escape-pipe $a\ a\ d$, constructed and operating in the manner and for the purpose herein specified.

SARAH E. SAUL.

Witnesses:
WM. F. MCNAMARA,
M. M. LIVINGSTON.